Aug. 15, 1933.  H. E. MATTIN  1,922,548
SURFACE ORNAMENTING COMPOSITION AND METHOD
OF PREPARING AND APPLYING THE SAME
Filed April 1, 1931

INVENTOR
Harry E. Mattin
BY
ATTORNEYS.

Patented Aug. 15, 1933

1,922,548

UNITED STATES PATENT OFFICE 1,922,548

SURFACE ORNAMENTING COMPOSITION AND METHOD OF PREPARING AND APPLYING THE SAME

Harry E. Mattin, Brooklyn, N. Y., assignor to Joseph H. Meyer Brothers, Brooklyn, N. Y., a Corporation of New York Application April 1, 1931. Serial No. 526,804

13 Claims. (Cl. 91—68)

This invention relates to a surface ornamenting composition and the method of preparing and applying the same.

The object of the invention is to provide a new and improved surface ornamenting composition and method of making and applying the same.

A further object of the invention is to provide a surface ornamenting composition having any desired predetermined, predominant coloring, or blend of colors, or color effects, which is economical to prepare and is adapted for application to or upon any surface to be ornamented, whether of wood, wall board, glass, sheet tin, sheet steel, cloth, leather, paper or the like.

A further object is to provide a surface ornamenting composition of any desired predominant coloring or blend of colors, and presenting a reticulated or scaly effect, or appearance, having multitudinous separated or circumscribed light reflecting areas indiscriminately interspersed throughout the same.

A further object of the invention is to provide a surface ornamenting composition, of the general nature referred to, having variegated color effects and surface designs of varying trends or formations, indiscriminately interspersed throughout the same to produce beautiful and variant areas of coloring and of indiscriminately interspersed and varied shapes of outline and surface design.

A further object of the invention is to provide a surface ornamenting composition of the nature referred to, and in the form of a liquid solution, and a method of controlling the same in its application so as to produce varying effects and appearances.

Other objects of the invention will appear more fully hereinafter.

The invention consists substantially in the composition and the method of producing and employing the same and the resulting product, all as will be more fully hereinafter set forth, as illustrated in the accompanying drawing, and finally pointed out in the appended claims.

In the accompanying drawing—

Figure 1:
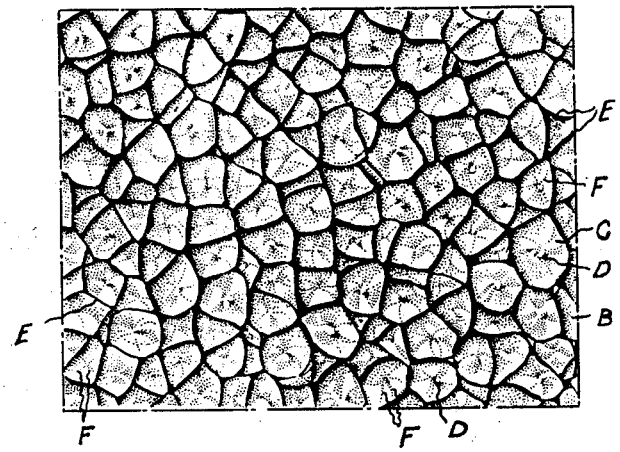
Figure 1 is a view in plan of a portion of an ornamental surface produce in accordance with my invention.
Figure 2:
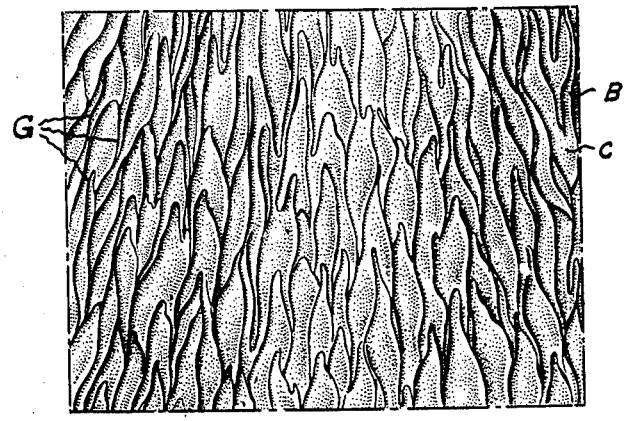
Fig. 2 is a similar view illustrating one form of variation in the ornamental effect.
Figure 3:
Fig. 3 is a sectional view illustrating the manner of application of an ornamental coating or film to a backing surface, and the removal of the same therefrom.

In carrying out my invention I provide a composition in the form of a liquid solution, containing a body material, or main vehicle, preferably in the form of a nitro cellulose solution such as pyroxylin lacquer, a substance of a granule or crystalline like nature which is insoluble in the said solution, such, for example, as pearl essence or fish scale pigment, a plasticizer, coloring matter, and, if desired, a suitable resin or gum.

Where the body material or main vehicle of the composition consists of nitrated cellulose, I prefer to use the same in the form of pyroxylin solution, using a cellulose obtained from cotton, wood fibre, or the like, and of as pure a grade as possible. The nitrated cellulose is used in the form of whitish fibrous particles dissolved in a suitable solvent. If desired, and in place of using nitro cellulose, which is highly inflammable, I may employ cellulose acetate, or other cellulose esters, ethers or ester-ethers, or combinations of these various substances, in order to reduce or eliminate the highly inflammable character of the film forming body of the composition. Notwithstanding the highly inflammable character of nitro cellulose for use in carrying out my invention, that material is preferable because it is cheaper and its nature and characteristics are more widely known, and it is more durable for use in carrying out my invention.

As above stated, the selected body, or film forming material, is reduced to a solution by a volatile solvent. A desirable characteristic of the solvent employed for this purpose is its quality of having a rapid rate of evaporation or volatilization, in order to secure the best permanent results, that is, in order to secure the desired promiscuous reticular, leaf or scaly appearance, or effects. The solvent employed should also be cheap, easily obtainable, and non-toxic.

In the use of nitrocellulose as a base material, I have found acetone the best solvent for my purposes, although I have used, with good results, ethyl acetate, mixtures of acetone and ethyl acetate, mixtures of alcohol and acetone, mixtures of ethyl acetate and amyl acetate, and various other substances. The resulting solution, best suitable for use in carrying out my invention, is in the form of a liquid of sufficient viscosity to enable it to flow readily without entrapping air. It should also be of sufficient liquidity to permit the formation, during the evaporation period, of ornamental, scaly and segregated or reticular ornamenting surface designs and effects. I have found that by varying the degree of viscosity or fluidity of the dissolved pyroxylin base material varying ornamenting effects are produced. I have also found that if the speed of evaporation of the solvent, in which the pyroxylin base substance is dissolved, is varied, a variation in the ornamentation or reticulated or scaly effect is produced. I have found that the more viscous the solution is the slower is the rate of evaporation and the less opportunity afforded for attaining the free eddying, boiling, or ebullition effects, which result in the production of the ornamental surface designs, and the thinner the solution the more rapid will be the rate of evaporation and the greater opportunity afforded for attaining the free eddying, boiling swirling action. I have found however that if the solution is too thin the best ornamental effects are not secured, and therefore in practice I prefer to employ a solution of such consistency as will flow readily.

Thus I am enabled to vary in almost unlimited degree the ornamenting effects secured in carrying out my invention.

The granular or crystalline-like material employed, may be of various kinds readily obtainable on the market, such as pearl essence, gold, aluminum, bronze powders, the material known by the trade name "H-Scale" or the like. In fact, I propose to employ any substance or material of a microscopic granular or crystalline nature which is capable of being carried in suspension in the liquid solution and which is insoluble therein.

For some purposes I prefer to use pearl essence for this purpose due to its light reflecting and dispersing properties, and it is readily obtainable on the market in the form of a silvery whitish viscous pasty mass. This paste is dissolved into a thin solution by adding the thick paste to the solution of film forming body material, as above described, in proper proportions, to secure the desired silvery sheen effects in the ornamental surface design to be produced. The pearl essence supplies into and throughout the body composition interspersed particles having light reflecting and dispersing surfaces which impart more or less whitish, nacreous, or pearly sheen, indiscriminately throughout the mass of the body composition.

Moreover, by reason of the tendency of the ebullition or boiling action which takes place, as will be hereinafter more fully described, to carry the particles of pearl essence to the surface rather than permitting the same to remain immersed in the solution to a greater depth, I am thereby enabled to enhance the sheen effects and at the same time employ a smaller amount of pearl essence, which is an expensive element of the solution.

The function of the plasticizer in the composition is, namely, to prevent the stock or body of the film from becoming brittle, or cracking, and to preserve the sheet form into which the solution is poured out onto a suitable surface after the same has been permitted to become set. If a proper plasticizer is used, the composition when applied to a surface as a coating, or when formed into sheets, does not tend to curl up or fracture. The plasticizer also tends to promote adherence of the applied coating. I have found in the practice that various plasticizers are suitable for use in carrying out my invention, such as di methyl phthalate, China Wood oil, dibutyl phthalate, camphor, tri-cresyl phosphate, and the like. It is to be understood, of course, that the plasticizer employed must be compatible with the selected solution of the film forming base or body material.

For some purposes I prefer to use di butyl phthalate. For forming ornamental celluloid sheets I prefer to use camphor as a plasticizer. A dye material which is compatible with the mixture of pyroxylin, pearl essence, and plasticizer, and of any desired color, may be employed in carrying out my invention. I have used dyes which are soluble in alcohol spirit, or other organic solvent, such as acetone, methyl cellosolve, etc. Dye materials which I have found suitable for use include Nigrosine, Rhodamine B, Luxol orange R, Malachite green, Cresyl blue, Luxine violet R. B. N., and F & S yellow.

I am giving here mostly the trade name designations of these various dye materials. In addition to the dye materials above mentioned, or in place of them, I may use well known organic or inorganic pigments, such as madder lake; toluidine toner, of the organic type, or raw sienna, or the like of the inorganic type.

Unlimited variation of color effects are obtained by mixing one or more of the enumerated color materials together, or by using one color for one portion of a surface and another one for another portion of the surface to be ornamented, and so on, thus securing not only an infinitely variegated color effect but also a beautiful blending effect of the colors in various regions or parts, indiscriminately, of the surface to be ornamented.

The principal function of the presence of gum or resin in the composition is to promote the better adhesion of the coating, sheet, or film, upon the surface to be ornamented, and especially upon surfaces like glass, tin, sheet steel, etc. Gums or resins suitable for the purpose such as shellac, glycol phthalates, gum damar, guaiac, ester gum, elemi gum, esterol #666, etc., are suitable for use in carrying out my invention. In fact any gum or resin material, whether natural or synthetic, which is capable of mixing with the pyroxylin lacquer may be employed. It is to be understood that the use of a resin or gum is not essential in carrying out my invention but is desirable in securing certain effects. When a gum or resin is used it is dissolved in a suitable solvent therefor. Ordinarily gums and resins suitable for my purpose are obtained on the market in soluble form which is sufficient for my purposes.

As an illustrative formula for use in combining the various materials constituting a composition, in accordance with my invention the following may be employed:

672 grams (24 oz.) of dry (or partially dry) nitrocellulose
54 grams of pearl essence (fish scale pigment) (= 6 grms. anhydrous crystalline guanine)
285 cc. di butyl phthalate
288 cc. Cresyl blue I may add that the 54 grams of pearl essence contains six grams of anhydrous crystalline guanine.

A suitable formula for use in coating a sheet which is to be removed from its backing for application to another surface is as follows—

672 grams of dry (or partially dry) nitrocellulose
54 grams of pearl essence
80 grams of camphor
288 c.c. Cresyl blue The whole composition in either formula is to be reduced to liquid state by the addition of a solvent such as acetone, in sufficient quantity to make one gallon of the final liquid.

A formula for using the Cresyl blue solution, suitable for the purpose of my invention, is:

1000 c.c. alcohol
50 grams Cresyl blue 6 B.N.

It is to be understood that these formulæ are merely illustrative.

The various ingredients, in liquid solution, as above outlined, are thoroughly mixed together, particularly to secure a thorough distribution of the granular or crystalline-like ingredient throughout the solution. The resulting solution should be in a sufficiently liquid state to enable the same to be readily and easily poured and to flow and spread evenly over the backing surface, or into sheet form, and the solvents employed for the various ingredients should be capable of volatilizing or evaporating at a comparatively rapid rate.

The composition may be applied to a surface by pouring or flowing, rolling, or spreading the same thereover, or it may be applied by brush, air blast, or other well known means of application of coatings to surfaces.

When the composition is applied to a backing surface or is poured into a shallow dish or tray, to a depth of, say, about one-eighth of an inch, more or less, and after the lapse of a few seconds of time, a most peculiar and interesting action begins. At innumerable points throughout the entire area of the surface, and in promiscuously interspersed relation with respect to each other, and at points more or less contiguous to each other, a boiling or erupting action seems to develop constituting what appears to be a myriad of infinitesimal or miniature geysers or eruptions. There appears to be at each of these points a physical boiling up or eruption of the liquid to the surface from a point beneath the surface, with a consequent appearance of a gradually rolling away of the liquid material from each erupting point in all directions.

As this action proceeds the material, which seems to boil up and flow from each point of ebullition or eruption, appears to meet the material as it flows from an adjacent point. The two seemingly opposing streams or flows of the material seem to meet each other and to be arrested at their line of meeting, thus, in effect, forming a dam for both flows along such line of meeting. Thereupon this line of meeting of the two flows appears to slightly harden and become more or less set. These hardening and setting lines form into boundary lines separating and enclosing small areas or spaces from each other. The boundary lines between adjacent small areas appear to be of a different color, or of a different shade of color, from that of the areas which they surround, varying in color according to the color material initially employed in the liquid composition. They are indiscriminately disposed with relation to each other, and have more or less uniformity of outline, and tend to arrange themselves in almost true geometric figures. The small areas or spaces which they seem to enclose also are of variegated color effects. Usually the effect or appearance of a pucker or bud is produced at the point of seeming eruption, with bright sheen effects more or less pronounced radiating from such point towards the enclosing boundary lines. This effect is probably due to the presence therein of light reflecting particles of the insoluble granules or crystal contained in the liquid composition. The production of the interspersed enclosed areas with their boundary lines throughout the entire surface of the applied or poured composition imparts a flowery, scaly, alligator, or shark-skin, or leaf effect, with a sheen and cast of variegated colors which is beautiful and highly ornamental.

I have found that the surface ornamentation, in the structural and relatively displaced arrangement of the areas or spaces and their boundary lines, and in the shape or trend of such lines and areas, as well as the variegated coloring effects obtained or produced, may be varied, as above described, by varying or controlling the rate and/or directional trend of evaporation of the solvent employed, and this can be done in a variety of ways. For example, after applying or pouring a composition containing one particular coloring matter to form a first layer, another composition containing a different color may be poured over or partially over or otherwise applied to the first layer while the latter is still fluid, thereby not only varying the rate of evaporation of the first coating or film but also securing a commingled and blended color effect. Another variation may be secured in the seemingly reticulated and color effects by slightly tilting the backing surface to which the composition has been applied, or slightly tilting the pan or tray into which it has been poured, while the composition is still in a more or less liquid state, or the tilting may be accomplished at various intervals of time, or at different degrees of liquid condition of the composition, or at different angles or directions of inclination. Such tilting action causes a flow of the liquid thereby varying, to some extent at least, the rate of evaporation, and also imparting to the surface ornamentations a directional trend corresponding to the direction of the inclination imparted, thereby more or less elongating the various small reticulated areas in a common direction or trend.

Variation may also be secured by stroking the teeth of a comb gently through the applied or poured thickness of coating while still in liquid condition. The elongation or uni-directional trend of the separated areas and their boundary lines, apparently caused by a gravitational movement of the liquid composition when the surface to which the composition is applied, or the tray into which it is poured is tilted, may likewise be varied by varying the line of tilt in various directions.

Further variation in color effects may be obtained by incorporating different colors at different stages of the evaporation action, or at different points in the surface.

I have found that by placing over and in close proximity to but out of contact with the surface of the composition, after the same has been applied or poured, and during the time the evaporation action is going on, the outline of a flower, a picture, stencil, or other design, the image of such flower, picture, stencil, or design is approximately reproduced in the surface of the ornamentation immediately below the position occupied thereby. I ascribe this phenomenon to the fact that the placing of the flower, picture, or design, exerts a control upon the trend or direction of escape of the solvent gases during the evaporation.

I have found also that varying color effects, as well as variation in the outline and appearance of the reticulated areas, may be secured by varying the rate or speed of evaporation as, for instance, by creating or maintaining a partial vacuum or, if preferred, a more or less gentle draft of air over and across the surface of the applied or poured composition, while the evaporation process is in progress, and, if desired, by varying the direction or the force or other characteristics of such air drafts, or by applying the same at various stages of the evaporation process.

Still further variation in color effect, as well as of arrangement and disposition of the separated areas, may be attained by placing a shield or plate over but out of contact with the surface to which the composition has been applied, or over the tray into which it has been poured, and at various stages of evaporation. For instance, a plate of glass suitably supported so as to cover more or less of the surface of the applied or poured composition, but slightly spaced therefrom more or less, will serve this purpose. If such a cover plate is slightly elevated at one end more than at the other a variation in ornamentation and color effect is also secured. I ascribe this variation to the more or less retarding of the rate of evaporation, since the cover acts to more or less house the solvent vapor, and prevent its rapid evaporation.

The ornamentation produced as above described, I believe to be a result of the evaporation or volatilization of the solvent employed, and variations in the ornamentations are secured by varying the rate of such evaporation or volatilization, or the directional trend thereof. This variation is controlled by increasing or retarding the said rate, and this can be accomplished either chemically, by properly varying the character of the solvent, or of the plasticizer used, or physically by mechanically causing the vapors to be removed or carried off in controlled direction or speed, or by confinement of the vapors.

In practice I prefer not to employ the cover plate until a thin skin appears to form on the surface of the applied or poured composition. The reason for this is that when the thin skin forms the final ornamental design has become more or less fixed and set, although it is still subject to change or variation. The effect of applying the cover plate at this stage is that the formed film becomes more or less softened by the solvent action of the confined vapors, although the boiling action beneath the film continues. This causes the particles of granular or crystalline-like material to be carried upwardly toward the surface, thereby securing a greater concentration in the ornamental surface of the sheet of the light reflecting and dispersing particles. As hereinbefore described, this enables me to use a minimum quantity of the expensive pearl essence element, when that material is used, to secure the desired ornamental effect. The use of the cover plate also seems to prevent the formation of shriveling effects in the surface of the ornamentation, and to cause the production of larger reticulated areas of the character and nature above described.

In other words, these myriad areas appear to spread out or to enlarge, due, possibly, to the retention of the solvent gases and vapors in contact with the surface by the superposed lid or cover.

In the course of a comparatively short period of time, from, say one half hour to three hours, depending on the control of volatilization after applying or pouring the composition, as above described, the boiling or erupting action, referred to, seems to gradually die down and finally cease, and the coating or sheet becomes more or less hardened and set, and the ornamental design produced in the surface thereof becomes fixed in all the beautiful effects of mechanical disposition and arrangement, and of coloring and sheen thereof. I take this to mean that the evaporation action of the solvents is substantially completed during this period. However, I prefer to allow the coating or sheet to remain undisturbed for a longer period, say, for example, for twenty-four hours, in order to insure the completion of solvent evaporation. Thereafter, I find it preferable to subject the coating or sheet to a period of seasoning, for, say, several days to three weeks, depending on its thickness, to allow thorough setting and hardening. At the end of the seasoning period the ornamented surface or sheet is ready for use in the fabrication of various commercial products or for other purposes for which it is adapted.

I have found that after applying the composition to a surface which has been suitably prepared, and after the completion of the evaporation period, and the proper seasoning of the coating the entire coating may be removed intact, as a sheet or film, from the surface onto which the composition has been poured. This sheet or film contains the design and ornamentation which has been formed on its surface by the action above described, with all of its variegations in color and reticulated area effects. It has the appearance of a thin sheet or film of general leather-like, or celluloid-like appearance and characteristics, and may be used for various commercial purposes. The removable coating or film is best produced by pouring the composition, or combinations of compositions, upon a smooth non-porous lubricated surface, such for instance, as glass. Such a surface renders it easy to strip off the completed coating or film. The coating or film thus produced may be applied as a surface ornamentation to any suitable fabric or surface by proper manipulation, or the sheet or film itself may be molded by the use of suitable heated presses or dies into any desired form or shape, or they may be affixed to plastic materials such as pyroxylin, etc.

Wall boards, wooden panels, screens, and other articles, or surfaces, unlimited in number and use, may be ornamented in accordance with my invention by the application of the composition, or combinations thereof, and the modes of application, as above described, or by the application thereto of sheets or films produced as above set forth, and with an infinite variety of the most beautiful and ornamental effects, such as peacock feather effects, fish scale effects, alligator or shark-skin effects, shell effects, leaf effects, flower designs, and so on, in unlimited variety and variation.

While realizing the difficulty of adequately showing in drawings the beautiful coloring and other effects of surface ornamentations accomplished in accordance with and in carrying out my invention I have attempted in the accompanying drawing to illustrate certain characteristics thereof.

I have found that if a more or less viscous solution is employed a thin surface film forms within a few minutes after the solution is poured. If, at this stage a thin coating of solvent solution is poured over the thin surface film and thereafter the rate of evaporation or vaporization is properly controlled a hard, smooth, polished, glossy, mirror-like surface, carrying the ornamental effects is produced. This result I ascribe to the action of the solvent causing the thin surface film initially formed on the sheet to become softened, thereby more or less eliminating or reducing the minute pores produced in the initial thin surface film.

At A I have shown a suitable backing which may be a sheet or panel or tray, or glass, wood, wall board, tin, or the like, and at B a coating or film applied thereto. By the action which takes place during the period of evaporation of the solvent, as above explained, the exposed area or surface of the coating or film has produced therein the appearance of separated areas or spaces C of irregular outline, each having a point or spot indicated at D having the appearance of a small pucker or blister with more or less bright nacreous rays radiating therefrom, as indicated at F, each space or area seeming to be enclosed in boundary lines indicated at E arranged in various relative shapes, sizes and disposition, the whole aspect being somewhat similar to the appearance of fish scales, or to alligator or shark skins. At G I have indicated a unidirectional trend or elongation effect produced in the areas and their boundary lines by the manipulative control as explained, of the flow of and rate of evaporation of the solvent employed, in the liquid solution.

The pucker points or buds D represent the craters or boiling up points to which I have before referred.

While the appearance is one of a multiplicity of physically separated areas with the more or less central pucker or blister points D, and enclosing boundary lines, nevertheless, it is to be understood that the decorated surface remains substantially smooth and even throughout its entire area.

It is of course apparent from this disclosure that the thickness of the layer of coating as applied to a base, must be such that the insoluble pigment may easily migrate under the influence of the internal forces due to ebullition. It is not necessary that the coating be poured upon the supporting base but may be applied thereto in any known and convenient manner just so long as the applied layer is capable of producing the results of this invention. It follows therefore that the words "relatively thick layer" "layer" "thin layer" and the like as employed in the claims are intended in the sense of meaning a layer of the coating of such thickness as will permit the attainment of the ornamental surface of this invention. The layer as applied to the base is relatively thick with respect to a layer as would be applied to a surface by a brush for example. As a further illustration it is pointed out that in actual practice the layer may have a thickness of the order of twenty thousandths of an inch as a lower limit and may be considerably thicker than this. Of course, as is apparent, the thicker the layer as applied to the base, the longer it will take to completely evaporate the solvent to produce the finished product.

While I have described various modes of securing variation in color and other effects, and various ways of carrying my invention into practical use, I do not wish or desire to be limited or restricted in these respects to the specific compositions, effects, modes, or operations set forth. But what I claim as new and useful and of my own invention, and desire to secure by Letters Patent is:

1. The process which comprises mixing together, a cellulose derivative, a plasticizer and a sufficient quantity of a highly volatile solvent to form a freely flowing mixture, applying the mixture to a base to form a relatively thick layer thereon and evaporating the solvent from the layer so as to cause a free ebullition of the liquid whereby a plurality of contiguous defined areas are permanently formed in the layer.

2. The process which comprises mixing together, a cellulose derivative, a plasticizer and a sufficient quantity of a highly volatile solvent to form a freely flowing mixture, pouring the mixture onto a base to form a layer thereon and stripping the layer from the base to provide a continuous sheet.

3. The process which comprises applying in a thin layer a fluid mixture of a cellulose derivative, an insoluble pigment, and a highly volatile solvent to a base and evaporating the solvent, the quantity of solvent in the mixture being sufficient so that the free eddying action within the liquid layer which occurs, due to the rapid evaporation of the solvent, causes a migration of the insoluble pigment into an ornamental design.

4. The process which comprises applying in a thin layer a fluid mixture of a cellulose derivative, an insoluble pigment, and a highly volatile solvent to a base, evaporating the solvent, the quantity of solvent in the mixture being sufficient so that the free eddying action within the liquid layer which occurs, due to the rapid evaporation of the solvent, causes a migration of the insoluble pigment into an ornamental design, and stripping the layer from the base to provide a finished film.

5. A process which comprises pouring a mixture of a cellulose derivative, an insoluble granular pigment, a plasticizer and a highly volatile solvent in a fluid layer onto a base, and producing a controlled evaporation of the solvent to cause a free eddying, and boiling action effecting a free migration of the pigment into an ornamental design in the layer.

6. A process which comprises applying a mixture of a cellulose derivative, an insoluble granular pigment, a plasticizer and a highly volatile solvent in a fluid layer of a thickness to permit migration of the pigment under the influence of ebullition of the solvent to a base, producing a controlled evaporation of the solvent to cause a free eddying, and boiling action effecting a free migration of the pigment into an ornamental design in the layer and peeling the layer from the base to form a continuous strip.

7. A process comprising applying a solvent of nitro-cellulose in a highly volatile solvent to which is added, pearl essence, coloring matter and a plasticizer to a base to form a relatively thick layer thereon and causing evaporation of the solvent from the surface of the layer to cause a free internal and surface movement of the solution to effect an arrangement of the pearl essence and coloring matter into a decorative design.

8. A process comprising pouring a solution of a cellulose derivative in a volatile solvent carrying an insoluble pigment in suspension onto a base to form a layer thereon, evaporating the solvent until a thin skin forms on the surface of the layer, fixing the design formed by the ebullition of the solvent and then retarding the evaporation of the solvent so that its vapors contact the surface of the skin to soften it whereby the continued ebullition of the solvent carries the pigment to and concentrates it at the surface of the layer.

9. A process comprising pouring a solution of a cellulose derivative in a volatile solvent carrying an insoluble pigment in suspension onto a base to form a layer thereon, evaporating the solvent until a thin skin forms on the surface of the layer, applying a thin coating of solvent over the skin and causing evaporation of all solvent so as to form a smooth surface on the layer below which the ornamental design due to free eddying of the solution of the layer has formed.

10. As an article of manufacture, a sheet of material prepared in accordance with the process of claim 1 having an ornamental design formed thereon comprising a plurality of relatively transparent, clearly defined and contiguous areas of indiscriminate form and arrangement.

11. As an article of manufacture a sheet of material prepared in accordance with the method of claim 5 having a plurality of defined contiguous areas within which the areas the pigment has moved under the forces of ebullition as the solvent evaporated to impart an ornamental surface thereto.

12. A process comprising pouring a solution of a cellulose derivative and a highly volatile solvent carrying a pigment in suspension on to a base to form a fluid layer thereon, evaporating solvent from the layer whereby the pigment is arranged into a decorative design under the action of the internal forces in the liquid due to evaporation and then retarding the evaporation of the solvent whereby the layer hardens with a smooth surface.

13. The process which comprises mixing together a cellulose derivative and a sufficient quantity of a highly volatile solvent to form a freely flowing mixture, applying the mixture to a base to form a layer thereon and evaporating the solvent from the layer so as to cause a free ebullition of the liquid whereby a plurality of contiguous defined areas are permanently formed in the layer, the quantity of solvent being sufficient to permit the formation of said areas.

HARRY E. MATTIN.